US006985923B1

(12) United States Patent
Bates et al.

(10) Patent No.: US 6,985,923 B1
(45) Date of Patent: Jan. 10, 2006

(54) METHOD, ARTICLE OF MANUFACTURE AND APPARATUS FOR PROCESSING REDUNDANT ELECTRONIC MAIL MESSAGES

(75) Inventors: Cary Lee Bates, Rochester, MN (US); Paul Reuben Day, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 902 days.

(21) Appl. No.: 09/592,769

(22) Filed: Jun. 13, 2000

(51) Int. Cl.
*G06F 15/16* (2006.01)
(52) U.S. Cl. .......................................... 709/206; 707/5
(58) Field of Classification Search ................ 709/206, 709/203; 707/100, 3, 5
See application file for complete search history.

(56) References Cited

U.S. PATENT DOCUMENTS

| 5,813,009 A | * | 9/1998 | Johnson et al. | ............. 707/100 |
| 5,832,218 A | * | 11/1998 | Gibbs et al. | ................ 709/203 |
| 6,161,130 A | * | 12/2000 | Horvitz et al. | ............. 709/206 |
| 6,496,853 B1 | * | 12/2002 | Klein | ......................... 709/206 |
| 6,505,236 B1 | * | 1/2003 | Pollack | ....................... 709/206 |

* cited by examiner

*Primary Examiner*—Marc D. Thompson
(74) *Attorney, Agent, or Firm*—Patterson & Sheridan, LLP

(57) ABSTRACT

A method, article of manufacture, and apparatus for processing redundant electronic mail (e-mail) messages. In one embodiment, the method comprises receiving an e-mail message, and deleting the received e-mail message if the received e-mail message is substantially similar to an available e-mail message. As such, the received e-mail message is deleted if the received e-mail message is considered redundant to a recipient terminal.

31 Claims, 5 Drawing Sheets

METHOD, ARTICLE OF MANUFACTURE AND APPARATUS FOR PROCESSING REDUNDANT ELECTRONIC MAIL MESSAGES

BACKGROUND OF THE INVENTION

1. Field of the Invention

The invention relates to electronic mail systems and, more particularly, the invention relates to a method, article of manufacture and apparatus for processing redundant electronic mail messages.

2. Background of the Related Art

In today's electronic mail (e-mail) environment, many users or recipients of e-mail messages often forward the contents of received e-mail message to other e-mail users. The recipient may append additional comments to the received e-mail message or simply forward the received e-mail message to other e-mail users.

One problem associated with the utilization of forwarded messages is that a particular user or recipient may repeatedly receive the same e-mail message from different senders. The recipient may eventually become cluttered with redundant e-mail messages or become annoyed with reading or receiving these redundant e-mail messages.

Therefore, a need exists for a method, article of manufacture and apparatus for processing redundant e-mail messages.

SUMMARY OF THE INVENTION

The invention provides a method, article of manufacture and apparatus for processing redundant electronic mail (e-mail) messages. In one embodiment, the invention provides a method for processing an e-mail message comprising receiving the e-mail message, and deleting the received e-mail message if the received e-mail message is substantially similar to an available e-mail message. As such, the received e-mail message is deleted if the received e-mail message is considered redundant to a recipient terminal.

In another embodiment, the invention provides a method for processing redundant e-mail messages comprising forwarding an e-mail message addressed to at least one recipient terminal, determining whether the forwarded e-mail message is substantially similar to an available e-mail message, and deleting the forwarded e-mail message if the forwarded e-mail message is substantially similar to the available e-mail message.

The invention also provides an apparatus comprising a memory and a processing unit, where the apparatus is configured for processing redundant e-mail messages. The memory stores an e-mail program. The processing unit executes the e-mail program retrieved from the memory, receives an e-mail message, and deletes the received e-mail message if the received e-mail message is substantially similar to an available e-mail message.

Additionally, a computer readable medium storing a software program is provided, where the software program, when executed by a computer, causes the computer to perform a method. In one embodiment of the computer readable medium, the method comprises receiving an electronic mail message, and deleting the received electronic mail message if the received electronic mail message is substantially similar to an available electronic mail message.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE PREFERRED EMBODIMENT

Figure 1:
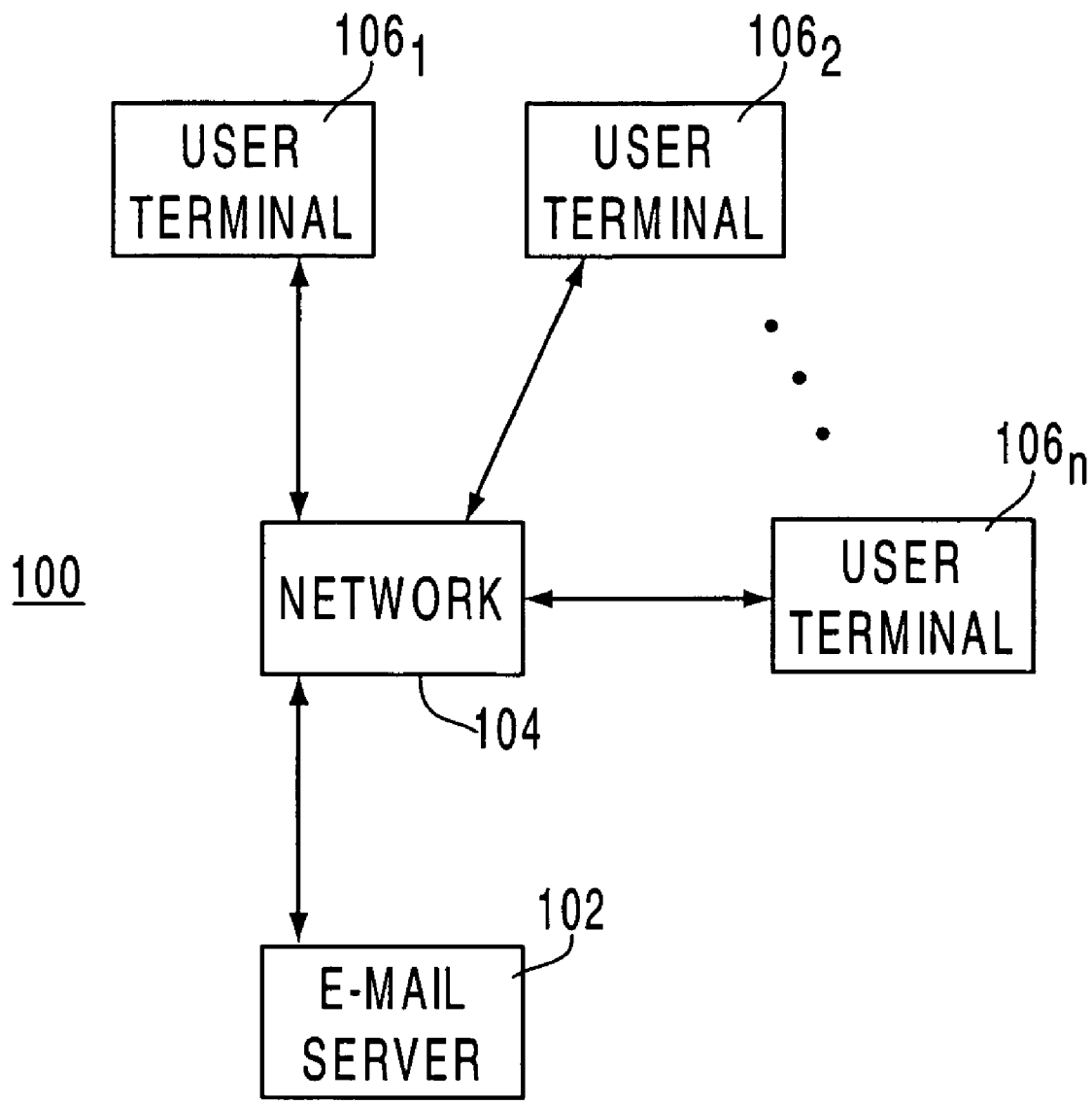
FIG. 1 depicts a simplified block diagram of an electronic mail (e-mail) system that benefits from the present invention.

FIG. 1 depicts a block diagram of an electronic mail (e-mail) system 100 that benefits from the use of the present invention. One embodiment of the present invention comprises an executable software routine(s) that generally resides within the user terminals 106. The system 100 comprises an e-mail server 102, a network 104 and a plurality of user terminals $106_1$, $106_2$, ... $106_n$. Each user terminal may be a computer system, an e-mail enabled network appliance, an e-mail enabled wireless device and the like. The user terminals 106 are connected to one another through the network 104 and also connected through the network 104 to the e-mail server 102. The e-mail server 102 provides e-mail services to all of the user terminals 106 such that e-mail addressed from one terminal to another is routed through the network 104 to the e-mail server 102. Each user terminal 106 may then retrieve its e-mail from the e-mail server 102. Although the system is shown having a hub and spoke configuration, other forms of networks may also benefit from the invention.

Figure 2:
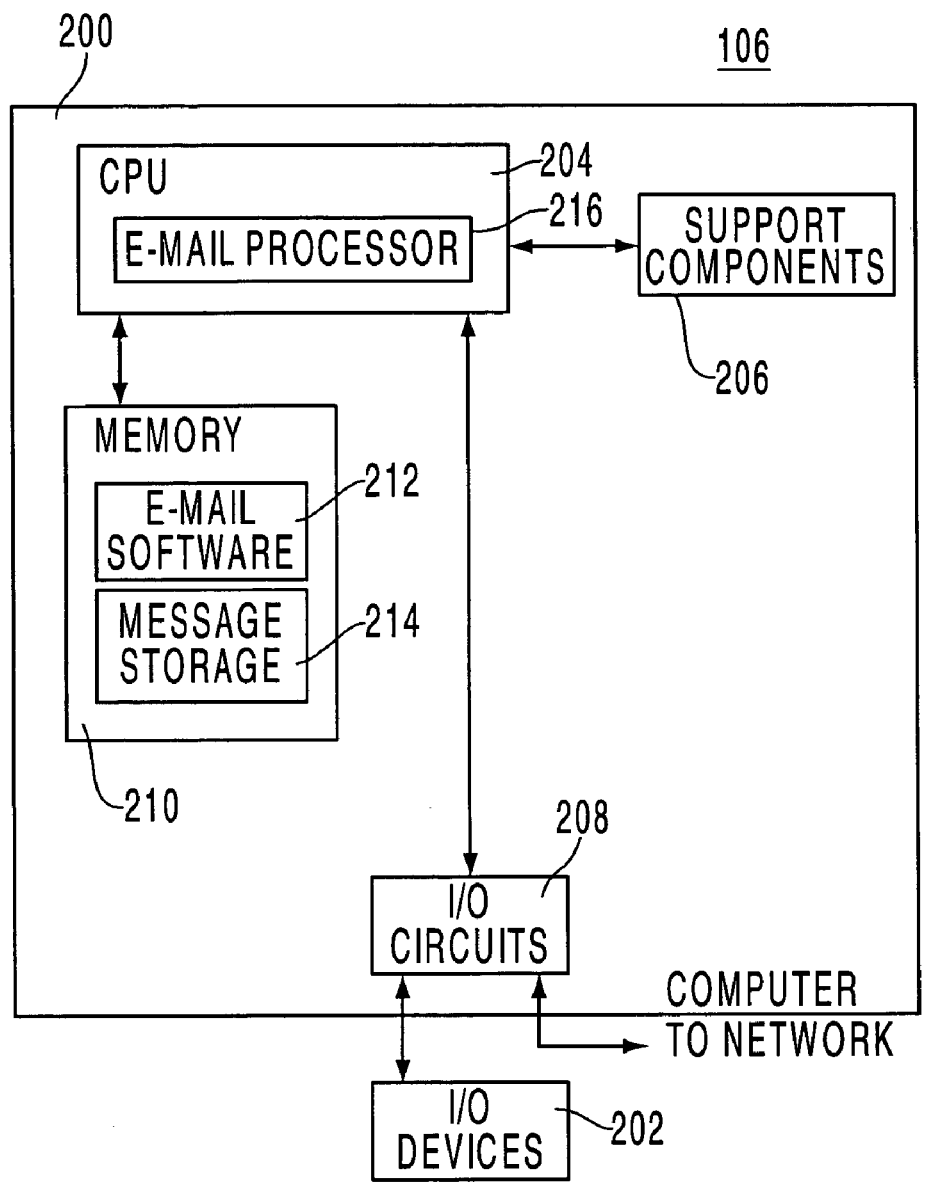
FIG. 2 depicts a simplified block diagram of a user terminal (computer) within the electronic mail system of FIG. 1.

FIG. 2 depicts a functional block diagram of a user terminal 106, e.g., a general purpose computer system. User terminal 106 comprises a computer 200 and an input/output device or devices 202 such as a monitor, a keyboard, a mouse, a trackball and the like. The computer 200 comprises a central processing unit 204, support components 206, input/output circuits 208 and a memory 210. The memory 210 may be a solid state memory, a disc drive, an optical memory, a removable memory device, or a combination of any of these memory devices. The input/output circuits 208 provide a well-known interface from the CPU 204 to the I/O devices 202. The support components 206 are well known in the art and include such circuits as cache, power supplies, clock circuits, and the like. The combination of all of these circuits, components and elements forms a general purpose computer that, when executing a particular software package or routine, is a specific purpose computer. In this case, the CPU 204, when executing the electronic mail processing software 212 of the present invention, operates as an e-mail processor 216. The e-mail software 212 resides in memory 210. In addition, the e-mail messages are stored in a message storage 214 within the memory 210. In addition, the I/O circuits 208 generally contain a network interface card or modem that couples the computer to the network of FIG. 1 such that e-mail messages can be routed to and from the computer 200.

In one embodiment of the present invention, the e-mail processor 216 forwards an e-mail message to a recipient terminal. Upon processing the forwarded e-mail message, the recipient terminal deletes the forwarded e-mail message if the recipient terminal identifies an available e-mail message that is substantially similar to the forwarded e-mail message. As such, the forwarded e-mail message is deleted if the e-mail message is considered redundant to the recipient terminal.

As will be described in detail below, another embodiment of the present invention is implemented as a program product for use with a computer system such as, for example, the system 100 shown in FIG. 1. The program(s) of the program product defines functions of the preferred embodiment and can be contained on a variety of signal/bearing media, which include, but are not limited to, (i) information permanently stored on non-writable storage media, (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. Such signal-bearing media, when carrying computer-readable instructions that direct the functions of the present invention, represent embodiments of the present invention.

Figure 3:
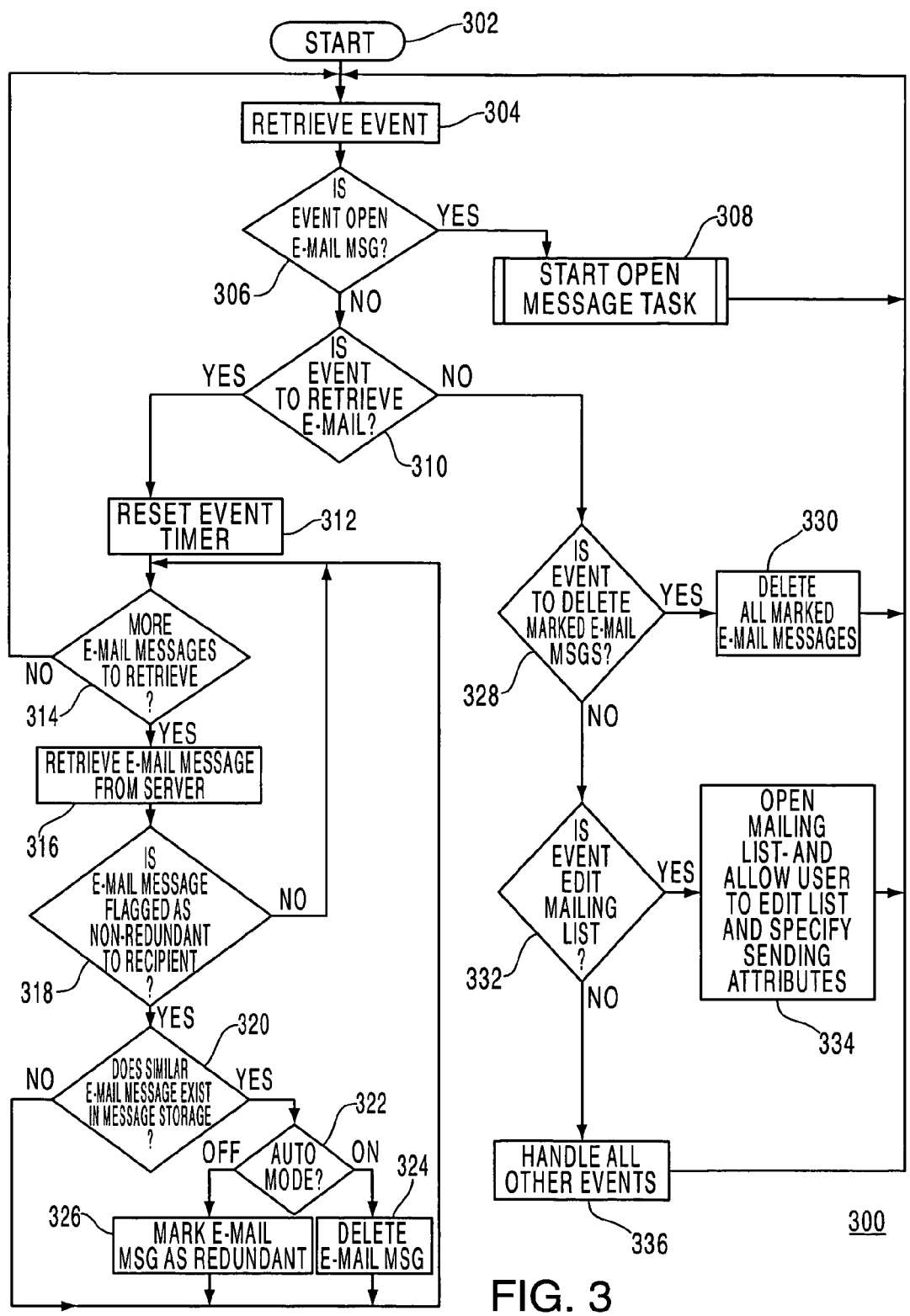
FIG. 3 depicts a flow diagram of a mail program for processing e-mail messages in accordance with the present invention.
Figure 4:
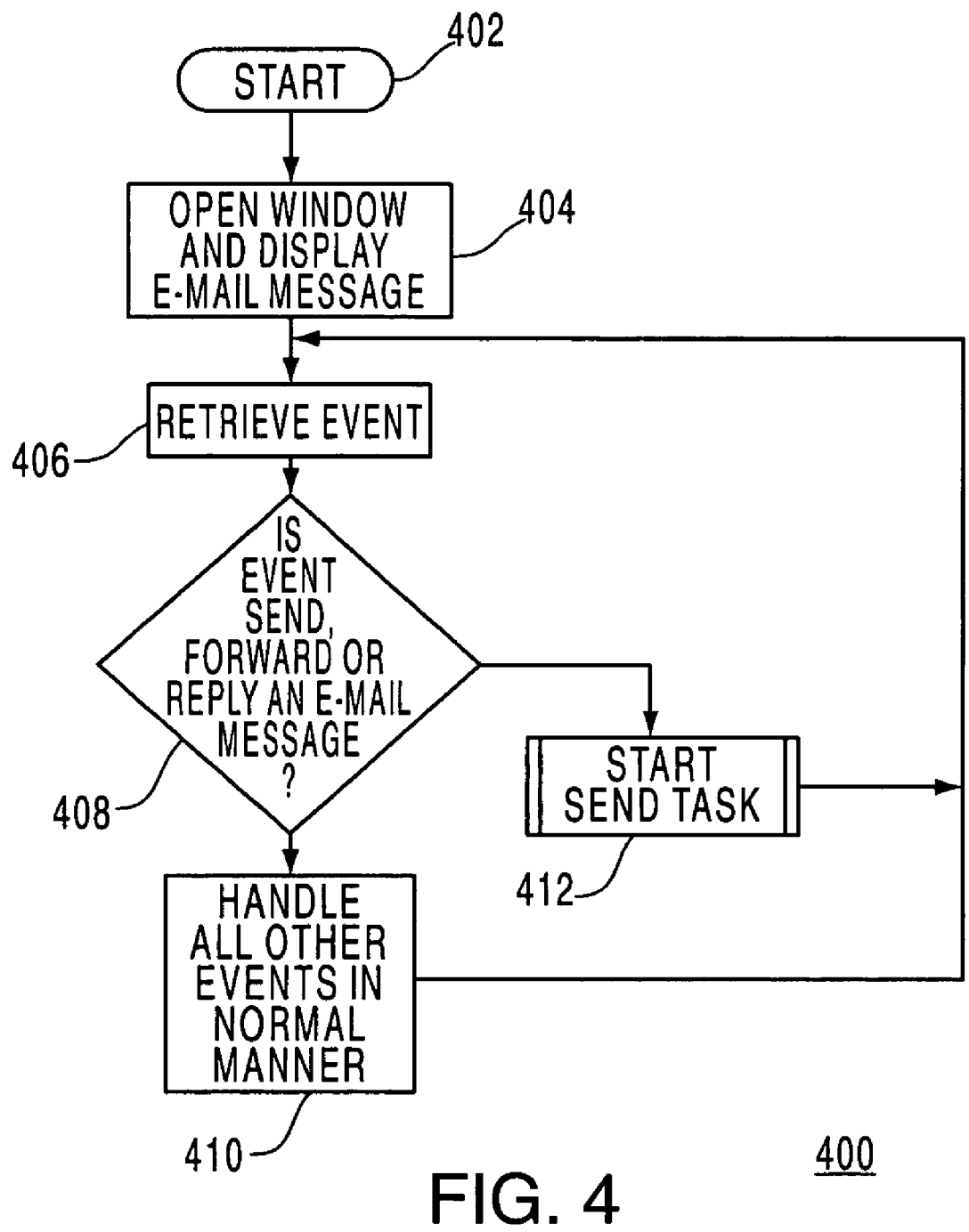
FIG. 4 depicts a flow diagram of a mail program for handling an opened message.
Figure 5:
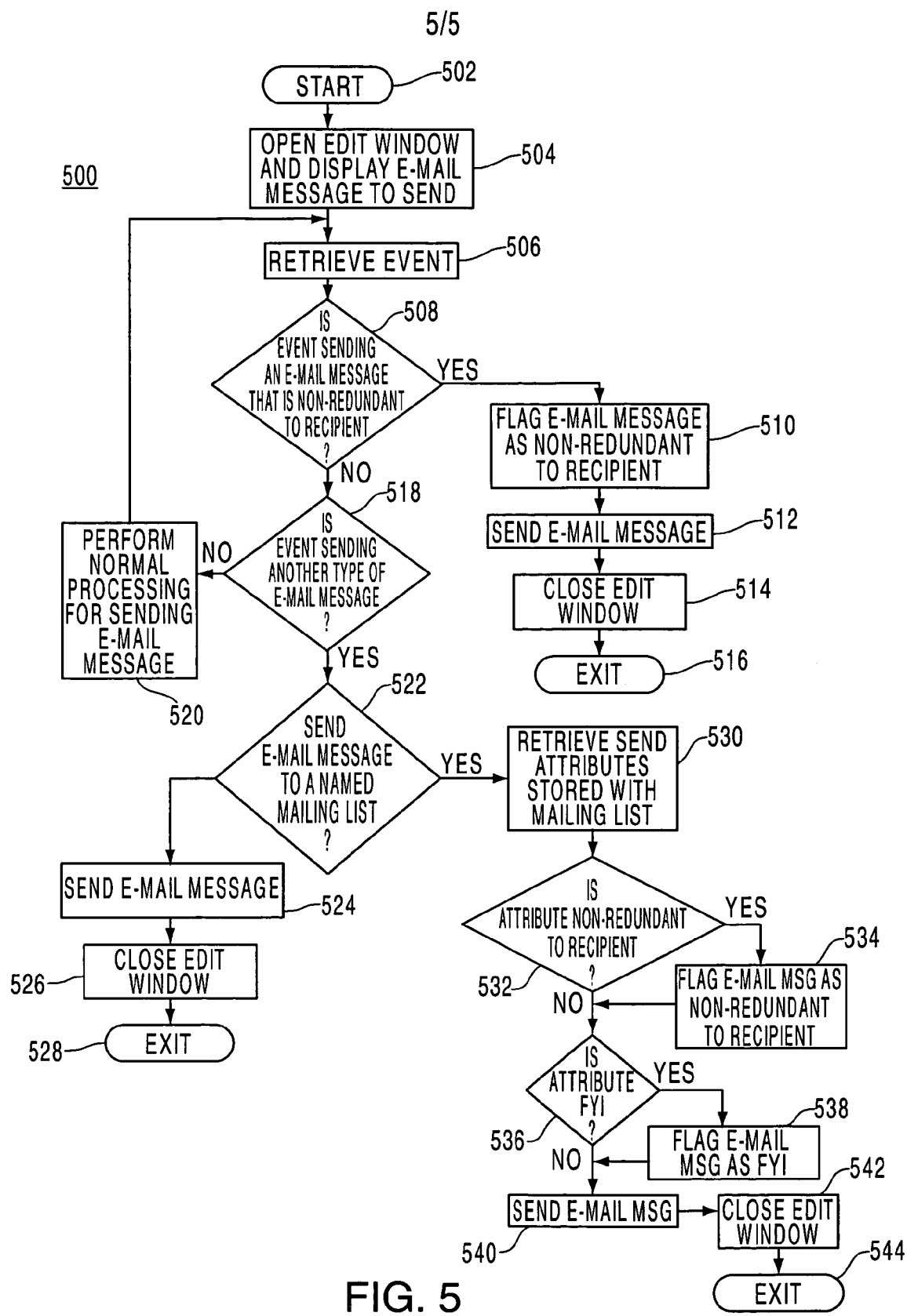
FIG. 5 depicts a flow diagram of a mail program for configuring e-mail messages in accordance with the present invention.

FIG. 3 depicts a flow diagram of a mail program for processing e-mail messages in accordance with the present invention. FIG. 4 depicts a flow diagram of a mail program for handling an opened message. FIG. 5 depicts a flow diagram of the mail program for configuring an e-mail message in accordance with the present invention. To best understand the invention, the reader should simultaneously refer to FIGS. 3–5.

Referring to FIG. 3, the mail program is embodied in a method 300 that starts at step 302 and proceeds to retrieve an event at step 304. Such events may represent a particular command from a user, e.g., opening an e-mail message, retrieving incoming e-mail messages, or confirming the deletion of marked e-mail messages. The method 300 operates in an event-driven manner, i.e., the method 300 retrieves events and performs different steps depending on a particular event retrieved.

At step 306, the method 300 queries whether the event is to open an e-mail message. If the event is to open an e-mail message, the method 300 proceeds to step 308, where an open message task is started. The open message task is embodied in a method 400 as described below with respect to FIG. 4. This open message task may be processed independently of method 300. After starting the open message task, the method 300 retrieves the next event at step 304.

If the event is not to open an e-mail message, the method 300 proceeds to step 310, where the query is whether the event is to retrieve incoming e-mail messages, i.e., get e-mail messages from the server 102. If the event is to retrieve incoming e-mail messages, the method 300 proceeds to reset the event timer step 312 and query whether there are incoming e-mail message to retrieve at step 314. If there are no incoming e-mail messages to retrieve or no additional incoming e-mail messages to retrieve, the method 300 proceeds to retrieve the next event at step 304. If there are more incoming e-mail messages to retrieve, the method 300 proceeds to step 316, where an incoming e-mail message is retrieved from the e-mail server 102.

At step 318, the method 300 queries whether the incoming e-mail message is flagged in accordance with the present invention, i.e., if the e-mail message is flagged, the recipient terminal determines whether to delete the incoming e-mail message. Control information embedded in the e-mail message, e.g., in a header, may be used to flag the e-mail message.

In one embodiment of the invention, a sender of the incoming e-mail message may flag or designate the e-mail message as an e-mail message that may be deleted if redundant. This embodiment is further described below in FIG. 5. In another embodiment of the invention, the recipient of the incoming e-mail message may also flag this e-mail message as an e-mail message that may be deleted if redundant. In this case, the recipient may flag the incoming e-mail message if the incoming or received e-mail message was substantially unaltered by a sender forwarding the e-mail message. In other words, the recipient may flag the incoming e-mail message if the sender forwarding an e-mail message did not provide additional text or attachments.

If the incoming e-mail message is not flagged, the method 300 returns to step 314 to determine whether additional e-mail messages are queried for retrieval. If the incoming e-mail message is flagged, the method proceeds to step 320, where a query is performed to determine whether the flagged e-mail message is at least substantially similar to an available e-mail message in the message storage 214. Accordingly, the method 300 determines whether to delete the incoming e-mail message only if the e-mail message is flagged.

The available e-mail messages contained in the message storage 214 comprise previously received, undeleted e-mail messages, which may include previously opened e-mail messages and unopened e-mail messages. Moreover, an available e-mail message contained in the message storage 214 is substantially similar to the flagged e-mail message if the identifier field of the available e-mail message is substantially similar to the identifier field of the flagged e-mail message. Information in the identifier field may comprise, for example, user information, subject information and timestamp information, e.g., date and time of a sent e-mail message.

If no available e-mail messages exist in the message storage 214, the method 300 proceeds to determine whether additional incoming e-mail messages are to be retrieved at step 314. If an available e-mail message exists in the message storage 214, the method 300 proceeds to step 322, where a query determines whether to automatically delete the flagged e-mail messages. Namely, step 322 determines whether a user has selected an automatic delete mode. If the automatic delete mode has been selected, the method 300 proceeds to delete the incoming e-mail message at step 324 and to determine whether more incoming e-mail messages are to be retrieved at step 314. If the automatic delete mode has not been selected, the method 300 proceeds to step 326, where the incoming e-mail message is marked as a duplicate message. After marking the e-mail message, the method 300 proceeds to determine whether additional incoming e-mail messages are to be retrieved at step 314. Steps 314 through 326 are repeated for each incoming e-mail message that is retrieved.

Returning to step 310, if the event is not to retrieve incoming e-mail messages, the method 300 proceeds to step 328, where a query determines whether the event is to delete marked e-mail messages. In the context of the present invention, such marked e-mail messages comprise duplicate or redundant e-mail messages. If the event is to delete marked e-mail messages, the method 300 proceeds to delete all marked e-mail messages at step 330 and proceeds to retrieve the next event at step 304. If the event is not to delete marked e-mail messages, the method 300 proceeds to step 332.

At step 332, the method 300 performs a query to determine whether the event is to edit a mailing list or a distribution list. Such a mailing list is utilized to conveniently send, e.g., forward, an e-mail message to at least one recipient or user. If the event is to edit the mailing list, the method 300 proceeds to step 334, where the mailing list is opened. Once the mailing list is opened, step 334 also enables a user to edit the mailing list and to specify sending attributes, e.g., attributes or features to implement when sending e-mail messages. A recipient terminal would process these attributes in substantially the same manner as the flag described with respect to step 318. In other words, the recipient of the incoming e-mail message may perform specific functions upon processing the attribute for the mailing list. For example, the recipient may determine whether to delete an incoming e-mail message if the attribute is configured for the recipient to delete redundant e-mail messages. Other attributes may specify the e-mail message as URGENT, FYI (for your information) or Automatic Acknowledgement. Moreover, certain attributes may be applied to specific recipients on the mailing list.

After opening the mailing list and specifying attributes, the method 300 proceeds to retrieve the next event at step 304. If the event is not to edit the mailing list, the method 300 proceeds to handle all other events at step 336 before retrieving the next event at step 304.

Referring to FIG. 4, the method 400 embodies an open message task that may be processed concurrently with the method 300 of the e-mail program. Method 400 starts at step 402 and proceeds to step 404 where a window is opened and the open message is displayed in the open window. The method 400 proceeds to retrieve an event at step 406.

At step 408, the method 400 determines whether the event is to send, e.g., forward or reply to, an e-mail message in response to the opened e-mail message. If the event is to send an e-mail message, the method 400 proceeds to step 412, where a send message task is started or activated. The send message task is embodied in a method 500 as described below in FIG. 5. After starting the send task, the method 400 proceeds to retrieve the next event at step 406. If the event is not to send an e-mail message, the method 400 proceeds to handle all other events in a normal manner in step 410 before retrieving the next event at step 406.

Referring to FIG. 5, the method 500 embodies a send task for configuring e-mail messages in accordance with the present invention. Method 500 starts at step 502 and proceeds to open an edit window at step 504. The open edit window displays the e-mail message to be sent. The method 500 proceeds to retrieve an event at step 506.

At step 508, the method 500 queries whether the event is to send an e-mail message in accordance with the present invention, e.g., send an e-mail message that is not redundant to a recipient terminal. If the event is to send a forward message in this manner, the method 500 proceeds to step 510 where the e-mail message to be sent is flagged. This flag may be provided in a control word embedded in the e-mail message. The method 500 proceeds to send the e-mail message at step 512, close the open edit window at step 514, and exit the method 500 at step 516.

In response to an e-mail message flagged and sent in respective steps 510 and 512, the recipient terminal processes the flag to determine whether to delete the sent, e.g., forwarded, e-mail message. This step was previously discussed with respect to step 318. The recipient terminal deletes the forwarded e-mail message if the forwarded e-mail message is substantially similar to an available e-mail message at step 320.

Returning to step 508, if the event is not to send a message that is not redundant to the recipient terminal, the method 500 proceeds to step 518, where a query determines whether the event is some other form of sending an e-mail message. If the event is not some other form of sending an e-mail message, the method 500 proceeds to perform normal send e-mail processing at step 520 and proceeds to retrieve the next event at step 506. If the event is some other form of sending an e-mail message, the method 500 proceeds to step 522 where a query determines whether an e-mail message is being sent to recipients addressed on a mailing list, e.g., a named distribution list. Namely, step 522 determines whether the e-mail message to be sent is linked to a distribution list.

If the e-mail message is not to be sent to a mailing list, the method 500 proceeds to send the e-mail message at step 524, close the edit window at step 526, and exit the method 500 at step 528. If the e-mail message is to be sent to a mailing list, the method 500 proceeds at step 530, where any "send attributes" are retrieved for the mailing list. These attributes may be configured in control information, e.g., a control word, sent in a header of an e-mail message. The attributes may be stored and retrieved with the mailing list. Different types of attributes are described above with respect to step 334.

At step 532, the method 500 queries whether an attribute is configured to provide a forwarded e-mail message that is not redundant to the recipient, i.e., a "non-redundant" attribute. If the non-redundant attribute is detected, the method 500 proceeds to step 534, where the e-mail message to be sent is flagged as a non-redundant forward message. The method 500 proceeds to step 536. If the non-redundant attribute is not detected, the method 500 directly proceeds to step 536.

At step 536, the method 500 queries whether a FYI (for your information) attribute has been configured. The FYI attribute is used when an e-mail message to be sent is of low importance. If the FYI attribute has been detected, the method 500 flags the message as a FYI message at step 538 and sends the e-mail message at step 540. If the FYI attribute is not detected, the method 500 directly proceeds to send the e-mail message at step 540. After step 540, the method proceeds to close the edit window at step 542, and exit the method 500 at step 544.

The method 500 may also incorporate other attributes contemplated within the scope of the present invention. For example, the method 500 may designate important e-mail messages with an URGENT attribute. If a sender desires automatic acknowledgement of a received e-mail message, then the method 500 would implement an Automatic Acknowledgement attribute.

Although various embodiments which incorporate the teachings of the present invention have been shown and described in detail herein, those skilled in the art can readily devise many other varied embodiments that still incorporate these teachings.

What is claimed is:

1. A method for processing redundant electronic mail messages comprising:
   receiving electronic mail messages addressed to a recipient, wherein a portion of the received electronic mail message include a respective redundancy attribute appended to the respective electronic mail message by a sender of the electronic mail message and a portion of the received electronic mail message do not include the redundancy attribute;
   for each received electronic mail message addressed to the recipient that includes an appended redundancy attribute:
      determining whether the received electronic mail message is at least substantially similar to an available, previously received electronic mail message also addressed to the recipient; and
      if so, deleting the received electronic mail message; and
   for each received electronic mail message addressed to the recipient that does not include an appended redundancy attribute, allowing the received electronic mail message to be made available to the recipient, whereby the presence of respective redundancy attributes causes received electronic mail messages with respective redundancy attributes to be selectively distinguished from received electronic mail messages without redundancy attributes and then deleted.

2. The method of claim 1 wherein the available electronic mail message comprises at least one of a plurality of undeleted electronic mail messages stored in a memory device of a recipient terminal at which the electronic mail message is received.

3. The method of claim 2 wherein the undeleted electronic mail messages comprise previously opened electronic mail messages and unopened electronic mail messages.

4. The method of claim 1 wherein the deleting is automatically performed if the received electronic mail message is substantially similar to the available electronic mail message.

5. The method of claim 1 wherein the deleting is performed upon confirmation by the recipient of the received electronic mail message if the received electronic mail message is substantially similar to the available electronic mail message.

6. The method of claim 1 wherein the available electronic mail message is substantially similar to the received electronic mail message if the available electronic mail message and the received electronic mail message have a substantially similar identifier field.

7. The method of claim 6 wherein the identifier field comprises at least one from the group of user information, subject information and timestamp information.

8. A method for processing redundant electronic mail messages comprising:
   receiving an electronic mail message addressed to at least one recipient;
   determining whether the received electronic mail message includes a redundancy attribute appended to the received electronic mail message by a sender of electronic mail message;
   if so, determining whether the received electronic mail message is redundant with respect to an available, previously received electronic mail message also addressed to the at least one recipient; and
   deleting the received electronic mail message if the received electronic mail message is redundant with respect to the available electronic mail message, whereby the presence of respective redundancy attributes causes received electronic mail messages with respective redundancy attributes to be selectively distinguished from received electronic mail messages without redundancy attributes and then deleted.

9. The method of claim 8 wherein the attribute comprises control information readable by an electronic mail processor and causing the electronic mail processor to perform the deleting if the attribute is included with the received electronic mail message.

10. The method of claim 9 wherein the control information is embedded in a header of the received electronic mail message.

11. The method of claim 8 wherein the available electronic mail message is substantially similar to the received electronic mail message if the available electronic mail message and the received electronic mail message have a substantially similar identifier field.

12. The method of claim 11 wherein the identifier field comprises at least one from the group of user information, subject information and timestamp information.

13. An apparatus for processing redundant electronic mail messages comprising:
   a memory for storing an electronic mail program; and
   a processing unit, coupled to the memory, for executing the electronic mail program retrieved from the memory, receiving an electronic mail message addressed to a recipient, and deleting the received electronic mail message if the received electronic mail message is at least substantially similar to an available, previously received electronic mail message also addressed to the recipient and if the received electronic mail message includes a redundancy attribute appended to the received electronic mail message by a sender of the received electronic mail message, whereby the presence of respective redundancy attributes causes received electronic mail messages with respective redundancy attributes to be selectively distinguished from received electronic mail messages without redundancy attributes and then deleted.

14. The apparatus of claim 13 further comprising a display unit, coupled to the processing unit, for displaying the available electronic mail message.

15. A computer readable medium storing a software program that, when executed by a computer, causes the computer to perform a method comprising:
   receiving an electronic mail message addressed to a recipient;
   determining whether the received electronic mail message includes a redundancy attribute appended to the received electronic mail message by a sender of received electronic mail message;
   if the received electronic mail message includes the appended redundancy attribute, deleting the received electronic mail message if the received electronic mail message is at least substantially similar to an available, previously received electronic mail message also addressed to the recipient; and
   if the received electronic mail message does not include the appended redundancy attribute, allowing the received electronic mail message to be made available to the recipient, whereby the presence of respective redundancy attributes causes received electronic mail messages with respective redundancy attributes to be selectively distinguished from received electronic mail messages without redundancy attributes and then deleted.

16. The computer readable medium of claim 15 wherein the deleting comprises determining whether the received electronic mail message was substantially unaltered by a sender of the received electronic mail message.

17. The computer readable medium of claim 16 wherein the deleting comprises:
flagging the received electronic mail message if the received electronic mail message was substantially unaltered by a sender of the received electronic mail message; and
deleting the flagged electronic mail message.

18. The computer readable medium of claim 15 wherein the available electronic mail message comprises at least one of a plurality of undeleted electronic mail messages stored in a memory device of the recipient terminal.

19. The computer readable medium of claim 18 wherein the undeleted electronic mail messages comprise previously opened electronic mail messages and unopened electronic mail messages.

20. The computer readable medium of claim 15 wherein the deleting is automatically performed if the received electronic mail message is substantially similar to the available electronic mail message.

21. The computer readable medium of claim 15 wherein the deleting is perform upon confirmation by the recipient of the received electronic mail message if the received electronic mail message is substantially similar to the available electronic mail message.

22. The computer readable medium of claim 15 wherein the available electronic mail message is substantially similar to the received electronic mail message if the available electronic mail message and the received electronic mail message have a substantially similar identifier field.

23. The computer readable medium of claim 22 wherein the identifier field comprises at least one from the group of user information, subject information and timestamp information.

24. A computer-implemented method for processing outbound electronic mail messages at a sending computer to identify redundant electronic mail messages addressed to a recipient, comprising:
launching an electronic mail message program on the sending computer;
receiving input for an electronic mail message addressed to the recipient;
appending a redundancy attribute to the electronic mail message, wherein the redundancy attribute configures an electronic mail processor on a receiving computer to determine whether the electronic mail messages is redundant with respect to other electronic mail messages addressed to, and received by, the recipient, whereby the presence of respective redundancy attributes allows the electronic mail processor on the receiving computer to selectively distinguish between received electronic mail messages that require the redundancy determination and those received electronic mail messages that do not require the redundancy determination; and
sending the electronic mail message.

25. The method of claim 24, wherein appending a redundancy attribute comprises configuring the electronic mail message with control information readable by the electronic mail processor.

26. The method of claim 24, wherein the redundancy attribute configures the electronic mail processor to delete the electronic mail message if the electronic mail message is redundant with respect to the other electronic mail messages.

27. The method of claim 24, wherein the appending is performed in response to a user command.

28. A computer-implemented method for processing outbound electronic mail messages at a sending computer to identify redundant electronic mail messages addressed to a plurality of recipients defined in a mailing list, comprising:
launching an electronic mail message program on the sending computer, wherein the electronic mail message program includes the mailing list and wherein the electronic mail message program is configured to append a redundancy attribute to each electronic mail message addressed to the mailing list;
receiving input for an electronic mail message addressed to the mailing list;
appending a redundancy attribute to the electronic mail message, wherein the redundancy attribute configures an electronic mail processor on a receiving computer to determine whether the electronic mail messages is redundant with respect to other electronic mail messages addressed to a same recipient, whereby the presence of respective redundancy attributes allows the electronic mail processor on the receiving computer to selectively distinguish between received electronic mail messages that require the redundancy determination and those received electronic mail messages that do not require the redundancy determination; and
sending the electronic mail message, whereby an instance of the electronic mail message is sent to each of the plurality of recipients defined in the mailing list.

29. The method of claim 28, wherein appending the redundancy attribute comprises configuring the electronic mail message with control information readable by the electronic mail processor.

30. The method of claim 28, wherein the redundancy attribute configures the electronic mail processor to delete the electronic mail message if the electronic mail message is redundant with respect to the other electronic mail messages.

31. The method of claim 28, wherein the appending is performed in response to a user command.

* * * * *